(12) United States Patent
McGarrahan et al.

(10) Patent No.: US 8,671,083 B2
(45) Date of Patent: Mar. 11, 2014

(54) ADAPTIVE, CONTEXT-BASED FILE SELECTION

(75) Inventors: Jim McGarrahan, Cary, NC (US); Ben Parees, Durham, NC (US); Clayton Sims, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1556 days.

(21) Appl. No.: 11/237,244

(22) Filed: Sep. 28, 2005

(65) Prior Publication Data

US 2007/0083481 A1  Apr. 12, 2007

(51) Int. Cl.
*G06F 17/30* (2006.01)
(52) U.S. Cl.
USPC .......................................................... 707/693
(58) Field of Classification Search
USPC .............................................................. 707/693
See application file for complete search history.

(56) References Cited

U.S. PATENT DOCUMENTS

| | | | |
|---|---|---|---|
| 5,889,993 A * | 3/1999 | Kroeger et al. | 717/128 |
| 6,018,342 A | 1/2000 | Bristor | 345/354 |
| 6,670,954 B2 | 12/2003 | Arai et al. | 345/420 |
| 6,751,777 B2 | 6/2004 | Bates et al. | 715/501.1 |
| 6,778,193 B2 | 8/2004 | Biebesheimer et al. | 345/805 |
| 2001/0037328 A1 | 11/2001 | Pustejovsky et al. | 707/3 |
| 2004/0205651 A1 | 10/2004 | Dutta et al. | 715/530 |
| 2005/0234688 A1 * | 10/2005 | Pinto et al. | 703/6 |
| 2005/0267844 A1 * | 12/2005 | Gallant et al. | 705/51 |
| 2005/0278449 A1 * | 12/2005 | Moss et al. | 709/228 |
| 2006/0136193 A1 * | 6/2006 | Lux-Pogodalla et al. | 704/2 |
| 2006/0235871 A1 * | 10/2006 | Trainor et al. | 707/102 |

OTHER PUBLICATIONS

Adobe Acrobat Professional, Sep. 23, 2005.*

* cited by examiner

*Primary Examiner* — Robert Beausoliel, Jr.
*Assistant Examiner* — Noosha Arjomandi
(74) *Attorney, Agent, or Firm* — Lee Law, PLLC; Christopher B. Lee

(57) ABSTRACT

Files may be managed in a data processing system by determining respective associativity values for the files. The respective associativity values represent likelihoods that respective ones of the files will be opened next if respective other ones of the files are currently open.

20 Claims, 4 Drawing Sheets

|        | file 1 | file 2 | file 3 | file 4 |
|--------|--------|--------|--------|--------|
| file 1 | 0      | 5      | 0      | 9      |
| file 2 | 5      | 0      | 0      | 7      |
| file 3 | 0      | 0      | 0      | 2      |
| file 4 | 9      | 7      | 2      | 0      |

*FIG. 3*

ADAPTIVE, CONTEXT-BASED FILE SELECTION

BACKGROUND OF THE INVENTION

The present invention relates to data processing methods, systems, and computer program products, and, more particularly, to data processing methods, systems, and computer program products for managing files.

Software applications are typically unaware of what a user is trying to accomplish at any given time. One way in which this is manifested is when opening a series of files, such as, for example, source code in an interactive development environment. A user may need to open several related files in various directories in the process of developing or debugging a problem. Conventional user interfaces may attempt to assist the user by providing a recent history of opened files and/or keeping the file selection dialog open to the last directory that the user opened a file from.

Neither of these approaches take into consideration that the next file the user wants to open may be related to the file or files that he or she is currently working with. Keeping a recent history of opened files may be ineffective because the recent history may not be strongly correlated with the future. For example, if a user works on ten files solving one problem and then opens ten different files working on a new problem, when the user returns to the first problem, the original ten files may no longer be in history as they may be replaced by the more recent ten files. Keeping the file selection dialog open to the last directory that the user opened a file from may also be ineffective because even related files may reside in different directories. A user may need to navigate multiple source trees to get to a desired file.

Although described above with respect to opening files, similar principles apply to Web browsers and opening Web pages. A Web browser may store a relatively large number of "bookmarks" or "favorites" and may also include a feature to store the last several Websites visited by a user. Conventional Web browsers, however, generally do not assist a user in getting to a next site that they may be interested in based on a site that they are currently viewing. Although Web browsing may be a somewhat random process, frequently a user may be trying to accomplish a specific goal. For example, managers in a company may visit various human resources and personnel sites during one session. Some users may always visit a certain set of Websites every morning or every day at lunch. It may be useful to detect these patterns to assist a user in navigating to a next likely destination in a more useful manner than listing, for example, a thousand Websites that have been bookmarked or the last ten sites that have been visited.

BRIEF SUMMARY OF THE INVENTION

According to some embodiments of the present invention, files may be managed in a data processing system by determining respective associativity values for the files. The respective associativity values represent likelihoods that respective ones of the files will be opened next if respective other ones of the files are currently open.

Although described primarily above with respect to method aspects of the present invention, it will be understood that the present invention may also be embodied as systems and computer program products.

BRIEF DESCRIPTION OF THE DRAWINGS

Other features of the present invention will be more readily understood from the following detailed description of specific embodiments thereof when read in conjunction with the accompanying drawings, in which:

FIG. 3 illustrates a file associativity matrix in accordance with some embodiments of the present invention.

DETAILED DESCRIPTION OF THE INVENTION

Figure 1:
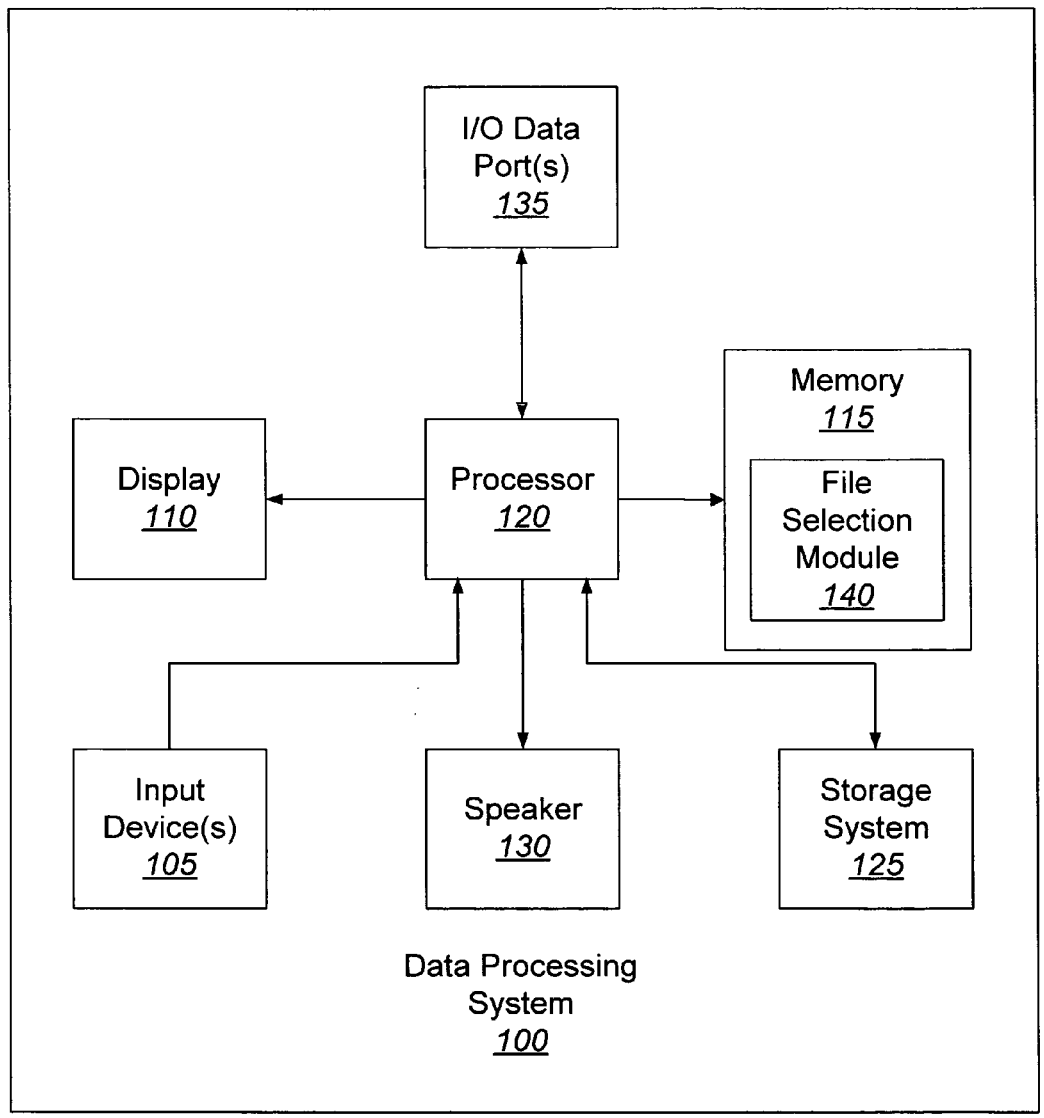
FIG. 1 is a block diagram that illustrates a data processing system in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "file" may include any construct that binds a conglomeration of information, such as instructions, numbers, words, and/or images into a coherent unit. Accordingly, a file may be, for example, a document, an image, an email, a database document (e.g., a Lotus Notes document), an application (e.g., a Powerpoint presentation), and/or a Web page.

FIG. 1 illustrates a data processing system 100 that may include a module for managing files through adaptive, context based file selection in accordance with some embodiments of the present invention. The data processing system 100 comprises input device(s) 105, such as a keyboard or keypad, a display 110, and a memory 115 that communicate with a processor 120. The data processing system 100 may further comprise a storage system 125, a speaker 130, and an I/O data port(s) 135 that also communicate with the processor 120. The storage system 125 may include removable and/or fixed media, such as floppy disks, ZIP drives, hard disks, or the like as well as virtual storage such as a RAMDISK. The I/O data port(s) 135 may be used to transfer information between the data processing system 100 and another computer system or a network (e.g., the Internet). These components may be conventional components, such as those used in many conventional computing devices, and their functionality, with respect to conventional operations, is generally known to those skilled in the art. The memory 115 may be configured with a file selection module 140 that may be used to manage files in the data processing system 100 through adaptive, context based file selection.

Figure 2:
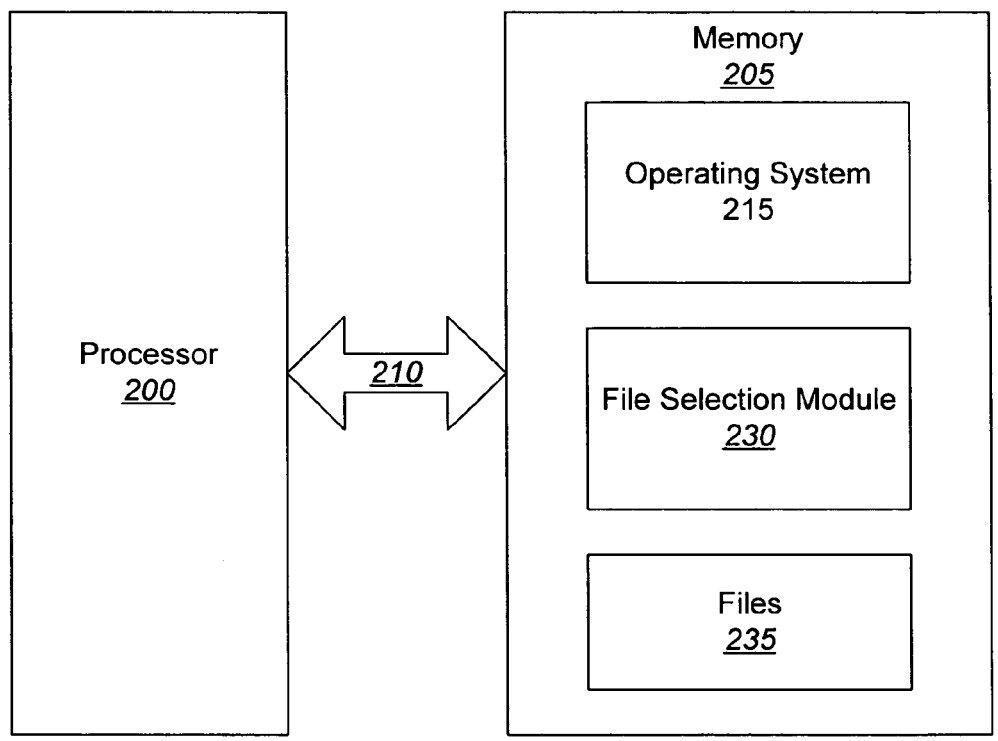
FIG. 2 is a block diagram that illustrates a software/hardware architecture for managing files in a data processing system through adaptive, context based file selection in accordance with some embodiments of the present invention.

FIG. 2 illustrates a processor 200 and memory 205 that may be used in embodiments of data processing systems, such as the data processing system 100 of FIG. 1, in which files man be managed through adaptive, context based file selection in accordance with some embodiments of the present invention. The processor 200 communicates with the memory 205 via an address/data bus 210. The processor 200 may be, for example, a commercially available or custom microprocessor. The memory 205 is representative of the one or more memory devices containing the software and data used adaptive, context based file selection in accordance with some embodiments of the present invention. The memory 205 may include, but is not limited to, the following types of devices: cache, ROM, PROM, EPROM, EEPROM, flash, SRAM, and DRAM.

As shown in FIG. 2, the memory 205 may contain up to three or more categories of software and/or data: an operating system 215, a file selection module 230, and files 235. The operating system 215 generally controls the operation of the data processing system. In particular, the operating system 215 may manage the data processing system's software and/or hardware resources and may coordinate execution of programs by the processor 200. The file selection module 230 may be configured to manage files through adaptive, context based file selection in accordance with some embodiments of the present invention. In some embodiments, the file selection module may determine associativity values for the files 235 in the data processing system. Each associativity value represents the likelihood that a particular other file will be opened next if a particular file is currently open. The file selection module 230 may also be configured to display a list of one or more files having associativity values that exceed, for example, a defined threshold. Based on historical patterns, these files may be more likely to be opened next and are, therefore, presented to the user to assist him or her as part of a file selection menu or dialog. Advantageously, the file selection module 230 may have a learning capability associated therewith by adjusting the associativity values for files as a user opens and closes files over time.

Although FIG. 2 illustrates exemplary hardware/software architectures that may be used in data processing systems, such as the data processing system 100 of FIG. 1, for managing files through adaptive, context based file selection, it will be understood that the present invention is not limited to such a configuration but is intended to encompass any configuration capable of carrying out operations described herein. Moreover, the functionality of the data processing system 100 of FIG. 1 and the hardware/software architecture of FIG. 2 may be implemented as a single processor system, a multi-processor system, or even a network of stand-alone computer systems, in accordance with various embodiments of the present invention.

Computer program code for carrying out operations of data processing systems discussed above with respect to FIG. 2 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for managing files in a data processing through adaptive, context based file selection, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
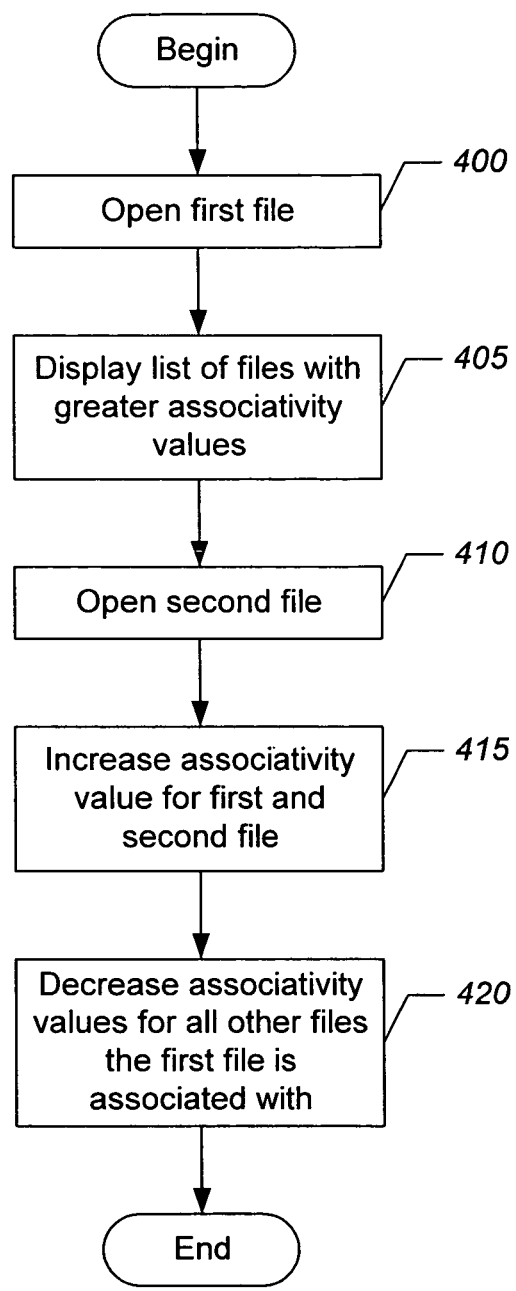
FIG. 4 is a flowchart that illustrates operations for managing files in a data processing system through adaptive, context based file selection in accordance with some embodiments of the present invention.

Referring now to FIGS. 3 and 4, exemplary operations for managing files in a data processing system through adaptive, context based file selection begin at block 400 where the data processing system opens a first file. At block 405, the data processing system may display a list of files for the user that have generally greater associativity values with the file that is open. For example, as shown in FIG. 3, a file selection module, such as file selection module 230 of FIG. 2, may maintain a matrix that contains associativity values for files that a particular user or users have opened on a data processing system. For purposes of illustrating embodiments of the present invention, the higher the associativity value, the greater the likelihood that the associated file will be opened next if a file is currently open. The associativity values in the matrix are symmetrical along a diagonal in accordance with some embodiments of the present invention. In other embodiments, the values need not be symmetric if the likelihood that a second file will be opened next if a first file is open is not the same as the likelihood that the first file will be opened next if the second file is open. In the example shown in FIG. 3, there is some likelihood that file 2 will be opened next if file 1 is currently open and an even greater likelihood that file 4 will be opened next if file 1 is currently open. A zero entry in the matrix means that there is no associativity between the two files. This may occur for a file pair when one file in the file pair has never been opened when the other file is currently open. Alternatively, the two files may have been associated with each other at one time and may have had a non-zero associativity value, but this value was allowed to decay to zero over time because a user did not open one file in the file pair when the other file was currently open for a period of time, which will be discussed further below.

Returning to FIG. 4, a user may be provided access to the files, for example, by displaying the files in a file selection menu or dialog such that only those files having an associativity value above a defined threshold are listed. In other embodiments, a user may be provided access to the files through a drop down menu or some other mechanism. In accordance with various embodiments of the present invention, the files may be sorted according to associativity value and/or name. For example, the files may be sorted so as to present a top ten list based on associativity or they may be sorted so as to present files having an associativity greater than a threshold where the threshold is configurable by the user. In other embodiments, a history component may be added, such as sorting the files so as to present the top ten most associated files that were opened in the last ten days.

At block 410, a second file is opened. For purposes of illustration, if file 4 is opened first and then file 3 is open, then at block 415, the associativity value between file 4 and file 3 may be increased to, for example, 3 in accordance with some embodiments of the present invention. At block 420, the associativity of one or more other files that file 4 is associated with may be decreased. For example, the associativity value between file 4 and file 1 may be decreased to 8.5 and the associativity between file 4 and file 3 may be decreased to 1.5. In accordance with some embodiments of the present invention, associativity values may be reduced by a lesser amount than associativity values are increased so as to implement a slow decay of file relationships that are not reinforced. In other embodiments, an associativity value may be reduced if a file has not been opened in some time period. In accordance with some embodiments of the present invention, the file associativity matrix may only include entries for those files that have been opened in a past predetermined time period. Some embodiments of the present invention have been described above in the context of a single file being open and then another file is opened. It will be understood that the present invention is not limited to such embodiments, but is also applicable if two or more files are open and then one or more other files are opened. For example, if files A and B are open and then a third file C is open, then the associativity values between A and C and between B and C are increased.

In accordance with further embodiments of the present invention, multiple associativity value matrices may be used to manage files in a data processing system. For example, one associativity value matrix may be used to manage files when a user is in a "work" mode while another associativity value matrix may be used to manage files when the user is in a "personal" mode as the associativity of files may be different depending on whether the user is performing his or her job or if the user is reviewing files for pleasure or personal business.

Advantageously, embodiments of the present invention may provide a file selection module that may build a model of a user's historical file choices based on the context that he or she was in at the time of that choice. This way, when a user finds his or her self working in a similar context, i.e., working on a similar set of files, browsing a similar sequence of Web pages, a data processing system may present a list of likely next choices for the user, which may be more specific than simply the most common opened file or the last ten files opened, which often are not relevant to what the user is working on at that particular moment.

The flowchart of FIG. 4 illustrates the architecture, functionality, and operations of some embodiments of methods, systems, and computer program products for managing files in a data processing system through adaptive, context based file selection. In this regard, each block represents a module, segment, or portion of code, which comprises one or more executable instructions for implementing the specified logical function(s). It should also be noted that in other implementations, the function(s) noted in the blocks may occur out of the order noted in FIG. 4. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of managing files in a data processing system, comprising:

determining respective associativity values for files in the data processing system, the respective associativity values representing likelihoods that respective ones of the files are opened next when respective other ones of the files are currently open;
opening a first one of the files on the data processing system;
opening a second one of the files on the data processing system;
adjusting an associativity value for the first and second ones of the files to reflect an increased likelihood that one of the first and second ones of the files is opened next when the other one of the first and second ones of the files is open; and
providing access to one or more files having associativity values representing greater likelihoods that the one or more files are opened next responsive to the opening of the one of the first and second ones of the files.

2. The method of claim 1, where providing access to the one or more files comprises:
displaying a list of one or more files having associativity values representing greater likelihoods that the one or more files are opened next responsive to the opening of the one of the first and second ones of the files; and
sorting the list of one or more files based on the associativity values and/or names of the one or more files.

3. The method of claim 1, further comprising:
adjusting an associativity value for the first and a third one of the files to reflect a decreased likelihood that one of the first and third ones of the files is opened next when the other one of the first and third ones of the files is open.

4. The method of claim 3, where the adjustment of the associativity value for the first and second ones of the files is greater than the adjustment of the associativity value for the first and third ones of the files.

5. The method of claim 3, where adjusting the associativity value for the first and the third ones of the files comprises:
adjusting all of the associativity values that have been determined for the first file and files other than the second file in the data processing system to reflect decreased likelihoods that one of the first and respective ones of the files other than the second file is opened next when the other one of the first and respective ones of the files other than the second file is open.

6. The method of claim 1, where the files in the data processing system comprise files that have been opened in a past pre-determined time period.

7. The method of claim 1, where determining the respective associativity values comprises determining respective first associativity values that are associated with a first mode, the method further comprising:
determining respective second associativity values for files in the data processing system, the respective second associativity values being associated with a second mode and representing likelihoods that respective ones of the files are opened next when respective other ones of the files are currently open.

8. The method of claim 1, where the files in the data processing system comprise a document, an image, an email, a database document, an application, and/or a Web page.

9. A system for managing files, comprising:
a data processing system configured to determine respective associativity values for files therein, the respective associativity values representing likelihoods respective ones of the files are opened next when respective other ones of the files are currently open;
open a first one of the files thereon;
open a second one of the files thereon;
adjust an associativity value for the first and second ones of the files to reflect an increased likelihood that one of the first and second ones of the files is opened next when the other one of the first and second ones of the files is open; and
display a list of one or more files having associativity values representing greater likelihoods that the one or more files are opened next responsive to the opening of the one of the first and second ones of the files.

10. The system of claim 9, where the data processing system is further configured to:
adjust an associativity value for the first and a third one of the files to reflect a decreased likelihood that one of the first and third ones of the files are opened next when the other one of the first and third ones of the files is open.

11. The system of claim 10, where the adjustment of the associativity value for the first and second ones of the files is greater than the adjustment of the associativity value for the first and third ones of the files.

12. The system of claim 10, where the data processing system being configured to adjust the associativity value for the first and the third ones of the files comprises the data processing system being configured to:
adjust all of the associativity values that have been determined for the first file and files other than the second file in the data processing system to reflect decreased likelihoods that one of the first and respective ones of the files other than the second file is opened next when the other one of the first and respective ones of the files other than the second file is open.

13. The system of claim 9, where the data processing system being configured to determine the respective associativity values comprises the data processing system being configured to determine respective first associativity values that are associated with a first mode, the data processing system being further configured to:
determine respective second associativity values for files therein, the respective second associativity values being associated with a second mode and representing likelihoods that respective ones of the files are opened next when respective other ones of the files are currently open.

14. The system of claim 9, where the data processing system is further configured to sort the list of one or more files based on the associativity values and/or names of the one or more files.

15. A computer program product for managing files in a data processing system, comprising:
a non-transitory computer readable storage medium having computer readable program code embodied therein, the computer readable program code comprising:
computer readable program code configured to determine respective associativity values for files in the data processing system, the respective associativity values representing likelihoods that respective ones of the files are opened next when respective other ones of the files are currently open;
computer readable program code configured to open a first one of the files on the data processing system;
computer readable program code configured to open a second one of the files on the data processing system;
computer readable program code configured to adjust an associativity value for the first and second ones of the files to reflect an increased likelihood that one of the first and second ones of the files are opened next when the other one of the first and second ones of the files is open; and computer readable program code configured to provide access to one or more files having associativity values representing greater likelihoods that the one or more files are opened next responsive to the opening of the one of the first and second ones of the files.

16. The computer program product of claim 15, further comprising:

computer readable program code configured to adjust an associativity value for the first and a third one of the files to reflect a decreased likelihood that one of the first and third ones of the files is opened next when the other one of the first and third ones of the files is open.

17. The computer program product of claim 16, where the adjustment of the associativity value for the first and second ones of the files is greater than the adjustment of the associativity value for the first and third ones of the files.

18. The computer program product of claim 16, where the computer readable program code configured to adjust the associativity value for the first and the third ones of the files comprises:

computer readable program code configured to adjust all of the associativity values that have been determined for the first file and files other than the second file in the data processing system to reflect decreased likelihoods that one of the first and respective ones of the files other than the second file is opened next when the other one of the first and respective ones of the files other than the second file is open.

19. The computer program product of claim 15, where the computer readable program code configured to determine the respective associativity values comprises computer readable program code configured to determine respective first associativity values that are associated with a first mode, the method further comprising:

computer readable program code configured to determine respective second associativity values for files in the data processing system, the respective second associativity values being associated with a second mode and representing likelihoods that respective ones of the files are opened next when respective other ones of the files are currently open.

20. The computer program product of claim 15, where the computer readable program code configured to provide access to the one or more files comprises:

computer readable program code configured to display a list of one or more files having associativity values representing greater likelihoods that the one or more files are opened next responsive to the opening of the one of the first and second ones of the files; and computer readable program code configured to sort the list of one or more files based on the associativity values and/or names of the one or more files.

* * * * *